(12) United States Patent
Tseng et al.

(10) Patent No.: US 10,278,256 B2
(45) Date of Patent: Apr. 30, 2019

(54) LED TUBE ADAPTED FOR USE WITH ELECTRONIC BALLAST

(71) Applicants: Wei-Jing Tseng, Kaohsiung (TW); Chung-Hung Yu, New Taipei (TW)

(72) Inventors: Wei-Jing Tseng, Kaohsiung (TW); Chung-Hung Yu, New Taipei (TW)

( * ) Notice: Subject to any disclaimer, the term of this patent is extended or adjusted under 35 U.S.C. 154(b) by 22 days.

(21) Appl. No.: 15/355,245

(22) Filed: Nov. 18, 2016

(65) Prior Publication Data

US 2018/0146528 A1 May 24, 2018

(51) Int. Cl.
*H05B 33/08* (2006.01)

(52) U.S. Cl.
CPC ..... *H05B 33/0884* (2013.01); *H05B 33/0806* (2013.01); *H05B 33/0815* (2013.01); *H05B 33/0842* (2013.01); *Y02B 20/348* (2013.01)

(58) Field of Classification Search
CPC .... H05B 33/08; H05B 37/02; H05B 33/0884; H05B 33/0809; H05B 33/0815; H05B 33/0842; H05B 33/0845; F21K 9/00; F21K 9/238; F21K 9/27; F21K 9/272; F21K 9/278; Y02B 20/343; Y02B 20/386
See application file for complete search history.

(56) References Cited

U.S. PATENT DOCUMENTS

| | | | | |
|---|---|---|---|---|
| 8,525,427 B2* | 9/2013 | Samoilenko | ....... | H05B 33/0809 315/185 R |
| 8,791,650 B2* | 7/2014 | Shan | ........................ | 315/185 S |
| 9,756,698 B2* | 9/2017 | Xiong | ................ | H05B 33/0887 |
| 2006/0193131 A1* | 8/2006 | McGrath | ............ | H05B 33/0803 362/227 |
| 2015/0351171 A1* | 12/2015 | Tao | ........................ | H05B 37/02 315/185 R |
| 2016/0102813 A1* | 4/2016 | Ye | ......................... | F21V 23/009 315/205 |
| 2016/0205738 A1* | 7/2016 | Lee | ..................... | H05B 33/0821 315/205 |
| 2016/0381760 A1* | 12/2016 | Xiong | ................ | H05B 33/0887 315/123 |

* cited by examiner

*Primary Examiner* — Thai Pham
(74) *Attorney, Agent, or Firm* — Allen, Dyer, Doppelt + Gilchrist

(57) ABSTRACT

An LED tube adapted for use with an electronic ballast is disclosed. The proposed LED tube includes a lossless filament simulation circuit having a first and a second output terminals and free from generating a power loss when the LED tube operated normally, wherein the lossless filament simulation circuit is electrically connected to the electronic ballast, and a bridge rectifier having a first and a second input terminals coupled to the first and the second output terminals respectively.

10 Claims, 3 Drawing Sheets

LED TUBE ADAPTED FOR USE WITH ELECTRONIC BALLAST

FIELD OF THE INVENTION

The present invention relates to a light-emitting diode (LED) tube adapted for use with an electronic ballast, in particular to an LED tube including a lossless filament simulation circuit, a current-limiting inductor, a high-voltage prevention and isolation circuit and a human body-leakage current isolation and high-voltage startup simulation circuit, adapted for use with an electronic ballast.

BACKGROUND OF THE INVENTION

When an LED tube is used to replace a fluorescent lamp tube, there are problems regarding the removal of the original ballast and jumper wire. Specifically, if the fluorescent lamp tube can be replaced with an LED tube that matches the electronic ballast, then it will greatly raise consumer acceptance because the electronic ballast is quite expensive. Thus, how to design an LED tube adapted for use with existing/commercially available electronic ballasts is worthy of further research and improvement.

Keeping the drawbacks of the prior art in mind, and through the use of robust and persistent experiments and research, the applicant has finally conceived of an LED tube adapted for use with an electronic ballast.

SUMMARY OF THE INVENTION

It is an objective of the present invention to provide an LED tube adapted for use with an electronic ballast, including a lossless filament simulation circuit, a current-limiting inductor, a high-voltage prevention and isolation circuit and a human body-leakage current isolation and high-voltage startup simulation circuit, wherein the lossless filament simulation circuit is free from generating a power loss when the LED tube operated normally, the high-voltage prevention and isolation circuit includes a capacitor and a resistor electrically connected in parallel and produces a high impedance at low frequency to prevent the LED tube from generating a break-down phenomenon and/or a flash-over phenomenon when a withstanding high voltage test of 1 k+2U is performed while the first ballast terminal and the second ballast terminal of the first lamp tube connector are short-circuited and the third ballast terminal and the fourth ballast terminal of the second lamp tube connector are short-circuited according to the IEC62776 specification, and the human body-leakage current isolation and high-voltage startup simulation circuit includes a thyristor element having a breakdown voltage to prevent the LED tube from becoming conductive before an input voltage reaches the breakdown voltage, protect the LED tube from burning out when mistakenly connected to one of an AC mains and an electronic ballast, and prevent a generation of a human body-leakage current when a 500 VAC AC mains frequency voltage test in the IEC62776 specification is performed.

In accordance with the first aspect of the present invention, an LED tube adapted for use with an electronic ballast comprises a lossless filament simulation circuit including a first and a second output terminals, a first to a fourth capacitors, and a first to a fourth resistors, wherein the electronic ballast has a first to a fourth ballast terminals, the first capacitor and the first resistor are electrically connected in parallel between the first ballast terminal and the first output terminal, the second capacitor and the second resistor are electrically connected in parallel between the first output terminal and the second ballast terminal, the third capacitor and the third resistor are electrically connected in parallel between the third ballast terminal and the second output terminal, and the fourth capacitor and the fourth resistor are electrically connected in parallel between the second output terminal and the fourth ballast terminal, a bridge rectifier having a first and a second input terminals and a first and a second output terminals, a current-limiting inductor electrically connected between the first output terminal of the lossless filament simulation circuit and the first input terminal of the bridge rectifier for limiting a current flowing through the electronic ballast, a high-voltage prevention and isolation circuit having a fifth capacitor and a fifth resistor electrically connected in parallel between the second input terminal of the bridge rectifier and the second output terminal of the lossless filament simulation circuit, an LED module circuit having a first and a second input terminals, wherein the first input terminal of the LED module circuit is electrically connected to the first output terminal of the bridge rectifier, and a human body-leakage current isolation and high-voltage startup simulation circuit is electrically connected between the second input terminal of the LED module circuit and the second output terminal of the bridge rectifier.

In accordance with the second aspect of the present invention, an LED tube adapted for use with an electronic ballast comprises a lossless filament simulation circuit including a first and a second output terminals, and electrically connected to the electronic ballast, a bridge rectifier having a first and a second input terminals, wherein the first input terminal is coupled to the first output terminal of the lossless filament simulation circuit, and a high-voltage prevention and isolation circuit having a capacitor and a resistor electrically connected in parallel between the second input terminal of the bridge rectifier and the second output terminal of the lossless filament simulation circuit.

In accordance with the third aspect of the present invention, an LED tube adapted for use with an electronic ballast comprises a lossless filament simulation circuit electrically connected to the electronic ballast and including a first output terminal, a bridge rectifier including a first input terminal, and a current-limiting inductor electrically connected between the first output terminal of the lossless filament simulation circuit and the first input terminal of the bridge rectifier, and limiting a current flowing through the electronic ballast.

BRIEF DESCRIPTION OF THE DRAWINGS

Other objectives, advantages and the efficacy of the present invention will be described in detail below taken from the preferred embodiments with reference to the accompanying drawings, in which.

DETAILED DESCRIPTION OF THE PREFERRED EMBODIMENT

The present invention will now be described more specifically with reference to the following embodiments. It is to be noted that the following descriptions of the preferred embodiments of this invention are presented herein for purposes of illustration and description only; they are not intended to be exhaustive or to be limited to the precise form disclosed.

Figure 1:
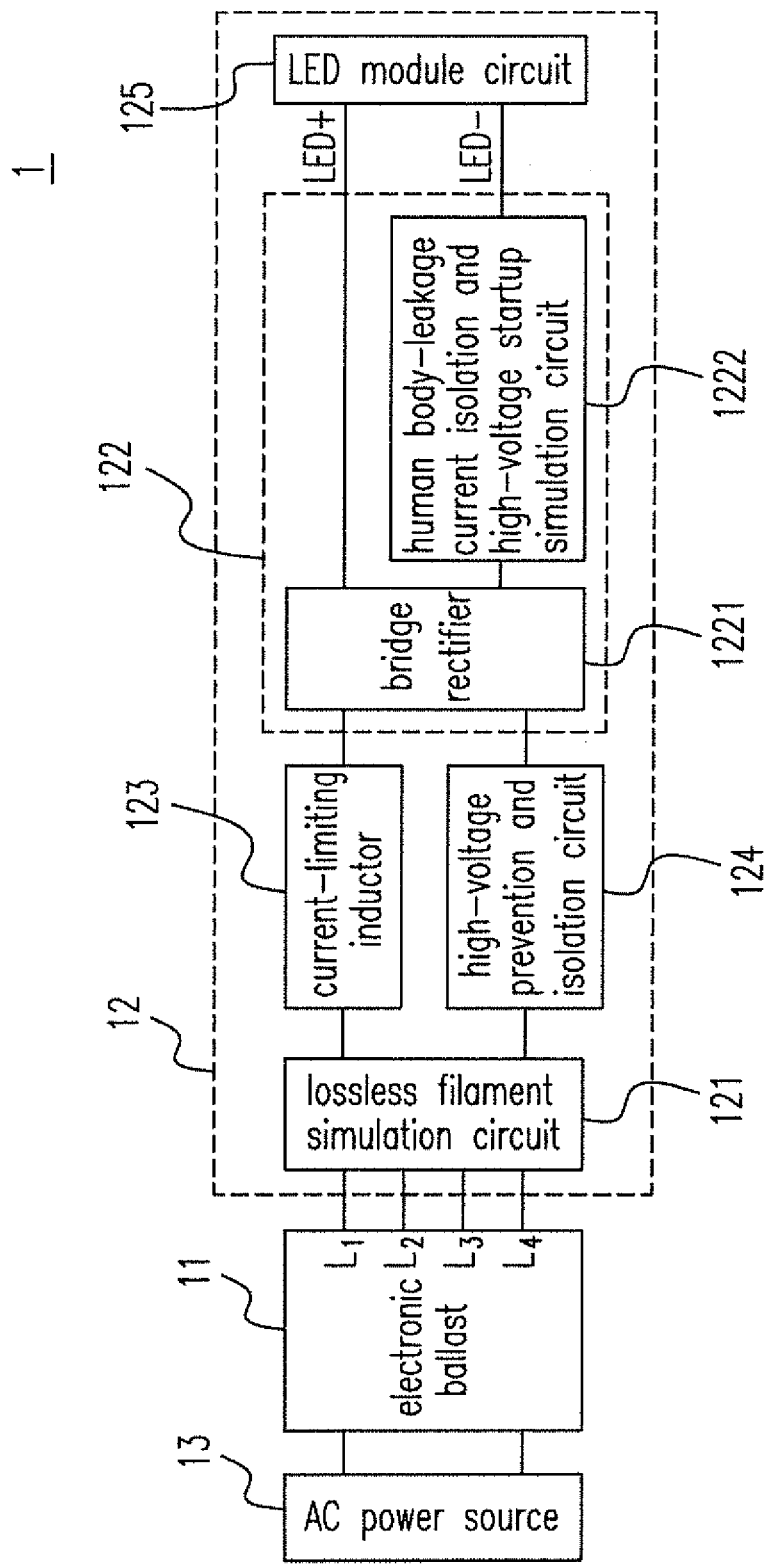
FIG. 1 is a block diagram of a lamp including an electronic ballast and an LED replacement tube according to the first preferred embodiment of the present invention.

FIG. 1 shows a block diagram of a lamp 1 including an electronic ballast 11 and an LED replacement tube 12 according to the first preferred embodiment of the present invention. In FIG. 1, the electronic ballast 11 includes a first lamp tube connector with a first ballast terminal and a second ballast terminal (L1-L2), and a second lamp tube connector with a third ballast terminal and a fourth ballast terminal (L3-L4), the LED replacement tube 12 includes a lossless filament simulation circuit 121, a main circuit 122 having a bridge rectifier 1221 and a human body-leakage current isolation and high-voltage startup simulation circuit 1222, a current-limiting inductor 123, a high-voltage prevention and isolation circuit 124, and an LED module circuit having a first input terminal (LED+) and a second input terminal (LED−), the lossless filament simulation circuit 121 is electrically connected to the first and the second lamp tube connectors (L1-L4) of the electronic ballast 11, and the electronic ballast 11 is electrically connected to an AC power source 13.

Figure 2:
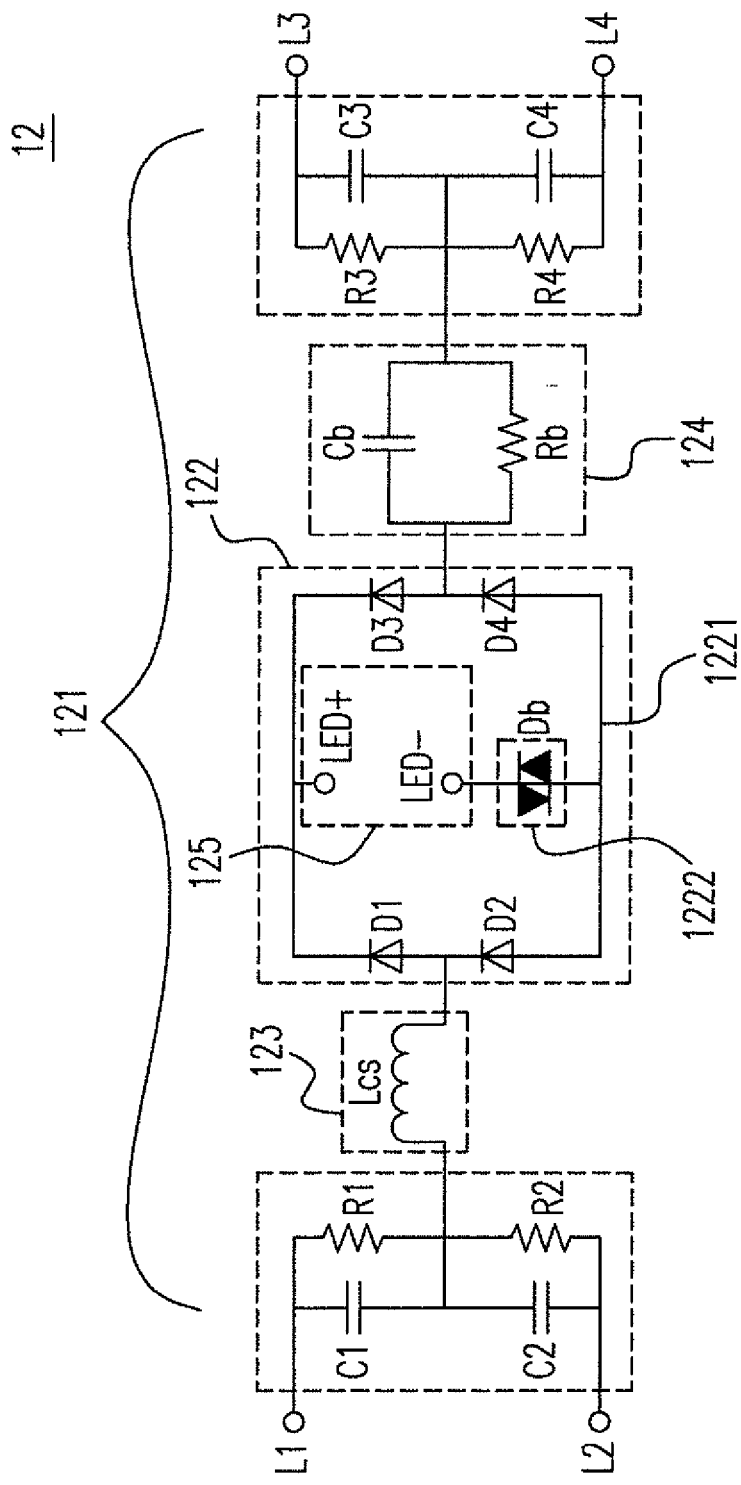
FIG. 2 is a circuit diagram of an LED replacement tube according to the first preferred embodiment of the present invention.

FIG. 2 shows a circuit diagram of an LED replacement tube 12 according to the first preferred embodiment of the present invention. As shown in FIG. 2, the lossless filament simulation circuit 121 includes a first to a fourth capacitors C1-C4, a first to a fourth resistors R1-R4 and a first and a second output terminals, the first capacitor C1 and the first resistor R1 are electrically connected in parallel between the first ballast terminal L1 and the first output terminal, the second capacitor C2 and the second resistor R2 are electrically connected in parallel between the first output terminal and the second ballast terminal L2, the third capacitor C3 and the third resistor R3 are electrically connected in parallel between the third ballast terminal L3 and the second output terminal, and the fourth capacitor C4 and the fourth resistor R4 are electrically connected in parallel between the second output terminal and the fourth ballast terminal L4. The bridge rectifier 1221 is a fast diode-bridge rectifier, and includes four fast diodes or four Schottky diodes D1-D4. The human body-leakage current isolation and high-voltage startup simulation circuit 1222 includes a thyristor element Db, the current-limiting inductor 123 is a current-limiting inductor $L_{CS}$ for a self-oscillating ballast, and the high-voltage prevention and isolation circuit 124 includes an RC circuit having a capacitor Cb and a resistor Rb electrically connected in parallel.

The circuits as shown in FIGS. 1 and 2 are applicable to all kinds of electronic ballasts (e.g., a rapid start electronic ballast, an instant start electronic ballast, a program start electronic ballast and a self-oscillating ballast), protect the LED replacement tube 12 from burning out when mistakenly connected to one of an AC mains and an electronic ballast, and can also pass both a human body-leakage current test and a withstanding high voltage test of 1 k+2U when the pins on the two terminals of the lamp tube are short-circuited in the IEC62776 specification.

As shown in FIG. 2, the first to the fourth capacitors C1-C4 and the first to the fourth resistors R1-R4 included in the lossless filament simulation circuit 121 simulates a filament impedance of a fluorescent lamp when the LED replacement tube 12 is started and is free from causing a loss in a circuit under a normal operation due to an extremely low high-frequency impedance of the first to the fourth capacitors C1-C4.

At least one of the lossless filament simulation circuit 121, the human body-leakage current isolation and high-voltage startup simulation circuit 1222, the current-limiting inductor 123 and the high-voltage prevention and isolation circuit 124 can be selectively kept, and the rest of the unselected elements of the lossless filament simulation circuit 121, the human body-leakage current isolation and high-voltage startup simulation circuit 1222, the current-limiting inductor 123 and the high-voltage prevention and isolation circuit 124 are omitted to include the other preferred embodiments of the present invention, and there are in total $2^3-1$ (all four elements are omitted)=15 different kinds of preferred embodiments. Specifically, if the lossless filament simulation circuit 121 is omitted, then a filament simulation circuit in the prior art is required to be added to its location to simulate the filament impedance when the LED replacement tube 12 is started.

As shown in FIG. 2, the main circuit 122 includes the bridge rectifier 1221 and the human body-leakage current isolation and high-voltage startup simulation circuit 1222 (including a thyristor element Db, wherein it can be any of thyristor elements, and it is an SIDAC as shown in FIG. 2). The bridge rectifier 1221 rectifies an AC signal Vac (not shown) into a DC signal to drive the LED module circuit 125. The thyristor element Db can prevent an input voltage of the LED replacement tube 12 from becoming conductive before reaching a breakdown voltage of the thyristor element Db, protect the LED replacement tube 12 from burning out when mistakenly connected to one of an AC mains and an electronic ballast, and prevent a generation of a human body-leakage current when a 500 VAC AC mains frequency voltage test in the IEC62776 specification is performed.

Figure 3B:
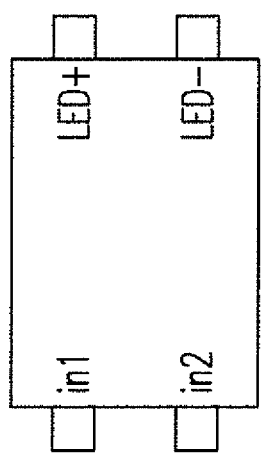
FIG. 3(b) is a schematic circuit diagram of a main circuit of an LED replacement tube, configured on a chip, according to the first preferred embodiment of the present invention.
Figure 3A:
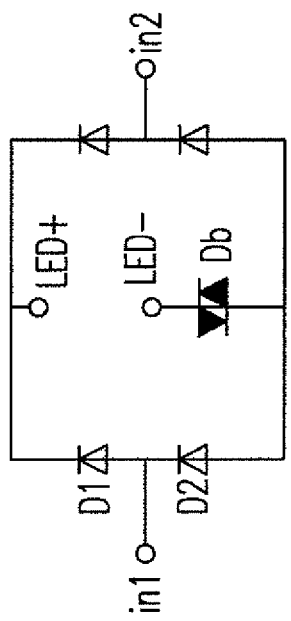
FIG. 3(a) is a circuit diagram of a main circuit of an LED replacement tube according to the first preferred embodiment of the present invention.

FIG. 3(a) shows a circuit diagram of a main circuit 122 of an LED replacement tube according to the first preferred embodiment of the present invention. The main circuit 122 can be an integrated circuit (IC) and configured on a chip. FIG. 3(b) shows a schematic circuit diagram of a main circuit 122 of an LED replacement tube, configured on a chip, according to the first preferred embodiment of the present invention.

In FIG. 2, the current-limiting inductor 123 ($L_{CS}$) is a current-limiting inductor for a self-oscillating ballast to change an impedance of a resonant tank of the electronic ballast so as to decrease a lamp tube current of the LED replacement tube 12 to adjust a lamp tube power thereof.

In FIG. 2, the high-voltage prevention and isolation circuit 124 (including Cb and Rb connected in parallel) produces a high impedance at low frequency to prevent the circuit from generating a break-down phenomenon and/or a flash-over phenomenon when a withstanding high voltage test of 1 k+2U is performed, wherein 1 k is 1,000V and 2U is 2 times a lamp tube voltage of the LED replacement tube 12 when operated normally.

Embodiments

1. An LED tube adapted for use with an electronic ballast, comprising:
   a lossless filament simulation circuit including:
   a first and a second output terminals;
   a first to a fourth capacitors; and a first to a fourth resistors, wherein the electronic ballast has a first to a fourth ballast terminals, the first capacitor and the first resistor are electrically connected in parallel between the first ballast terminal and the first output terminal, the second capacitor and the second resistor are electrically connected in parallel between the first output terminal and the second ballast terminal, the third capacitor and the third resistor are electrically connected in parallel between the third ballast terminal and the second output terminal, and the fourth capacitor and the fourth resistor are electrically connected in parallel between the second output terminal and the fourth ballast terminal;

a bridge rectifier having a first and a second input terminals and a first and a second output terminals;

a current-limiting inductor electrically connected between the first output terminal of the lossless filament simulation circuit and the first input terminal of the bridge rectifier for limiting a current flowing through the electronic ballast;

a high-voltage prevention and isolation circuit having a fifth capacitor and a fifth resistor electrically connected in parallel between the second input terminal of the bridge rectifier and the second output terminal of the lossless filament simulation circuit;

an LED module circuit having a first and a second input terminals, wherein the first input terminal of the LED module circuit is electrically connected to the first output terminal of the bridge rectifier; and a human body-leakage current isolation and high-voltage startup simulation circuit electrically connected between the second input terminal of the LED module circuit and the second output terminal of the bridge rectifier.

2. The LED tube according to Embodiment 1, wherein the electronic ballast further includes a first lamp tube connector having the first ballast terminal and the second ballast terminal and a second lamp tube connector having the third ballast terminal and the fourth ballast terminal, the bridge rectifier includes a first to a fourth diodes, each of which has an anode and a cathode, the anode of the first diode is electrically connected to the cathode of the second diode and the first input terminal of the bridge rectifier, the anode of the third diode is electrically connected to the cathode of the fourth diode and the second input terminal of the bridge rectifier, and an AC signal received by the first and the second input terminals of the bridge rectifier becomes a DC signal after being rectified to drive the LED module circuit.

3. The LED tube according to Embodiment 1 or 2, wherein the first to the fourth diodes are one of four fast diodes and four Schottky diodes, the human body-leakage current isolation and high-voltage startup simulation circuit includes a thyristor element, and the bridge rectifier and the human body-leakage current isolation and high-voltage startup simulation circuit are configured on a chip.

4. The LED tube according to any one of the above-mentioned Embodiments, wherein the thyristor element is one selected from a group consisting of a DIAC, an SUS, an SIDAC, an SBS, an ASBS, an SAS, an SCR, a TRIAC and a zener diode, is able to receive an external signal so as to perform a switching control, and has a breakdown voltage to prevent the LED tube from becoming conductive before an input voltage reaches the breakdown voltage, protect the LED tube from burning out when mistakenly connected to one of an AC mains and an electronic ballast, and prevent a generation of a human body-leakage current when a 500 VAC AC mains frequency voltage test in the IEC62776 specification is performed, the high-voltage prevention and isolation circuit causes a lamp tube current of the LED tube to be less than 100 mA when a withstanding high voltage test is performed while the first ballast terminal and the second ballast terminal of the first lamp tube connector are short-circuited and the third ballast terminal and the fourth ballast terminal of the second lamp tube connector are short-circuited according to the IEC62776 specification.

5. The LED tube according to any one of the above-mentioned Embodiments, wherein the high-voltage prevention and isolation circuit produces a high impedance at low frequency to prevent the LED tube from a break-down phenomenon and/or a flash-over phenomenon, and the current-limiting inductor is used for a self-oscillating ballast to change an impedance of a resonant tank of the electronic ballast so as to decrease the lamp tube current to adjust a lamp tube power.

6. The LED tube according to any one of the above-mentioned Embodiments, wherein the electronic ballast is one selected from a group consisting of a rapid start electronic ballast, an instant start electronic ballast, a program start electronic ballast and a self-oscillating ballast, and the lossless filament simulation circuit simulates a filament impedance of a fluorescent lamp and is free from causing a loss in a circuit under a normal operation due to an extremely low high-frequency impedance of the first to the fourth capacitors.

7. An LED tube adapted for use with an electronic ballast, comprising:

a lossless filament simulation circuit including a first and a second output terminals, and electrically connected to the electronic ballast;

a bridge rectifier having a first and a second input terminals, wherein the first input terminal is coupled to the first output terminal of the lossless filament simulation circuit; and a high-voltage prevention and isolation circuit having a capacitor and a resistor electrically connected in parallel between the second input terminal of the bridge rectifier and the second output terminal of the lossless filament simulation circuit.

8. The LED tube according to Embodiment 7, further comprising a current-limiting inductor, a human body-leakage current isolation and high-voltage startup simulation circuit and an LED module circuit, wherein the bridge rectifier further includes a first and a second output terminals, the LED module circuit includes a first and a second input terminals, the first input terminal of the LED module circuit is electrically connected to the first output terminal of the bridge rectifier, the current-limiting inductor is electrically connected between the first output terminal of the lossless filament simulation circuit and the first input terminal of the bridge rectifier for limiting a current flowing through the electronic ballast, the human body-leakage current isolation and high-voltage startup simulation circuit includes a thyristor element electrically connected between the second input terminal of the LED module circuit and the second output terminal of the bridge rectifier, the thyristor element has a breakdown voltage to prevent the LED tube from becoming conductive before an input voltage reaches the breakdown voltage, protect the LED tube from burning out when mistakenly connected to one of an AC mains and an electronic ballast, and prevent a generation of a human body-leakage current when a 500 VAC AC mains frequency voltage test in the IEC62776 specification is performed, the capacitor is a fifth capacitor, the resistor is a fifth resistor, the high-voltage prevention and isolation circuit is used to cause a lamp tube current of the LED tube to be less than 100 mA when a withstanding high voltage test is performed while the first ballast terminal and the second ballast terminal of the first lamp tube connector are short-circuited and the third ballast terminal and the fourth ballast terminal of the second lamp tube connector are short-circuited according to the IEC62776 specification, the lossless filament simulation circuit further includes a first to a fourth capacitors and a first to a fourth resistors, the electronic ballast has a first to a fourth ballast terminals, the first capacitor and the first resistor are electrically connected in parallel between the first ballast terminal and the first output terminal, the second capacitor and the second resistor are electrically connected in parallel between the first output terminal and the second ballast terminal, the third capacitor and the third resistor are electrically connected in parallel between the third ballast terminal and the second output terminal, and the fourth capacitor and the fourth resistor are electrically connected in parallel between the second output terminal and the fourth ballast terminal.

9. An LED tube adapted for use with an electronic ballast, comprising:
   a lossless filament simulation circuit electrically connected to the electronic ballast and including a first output terminal;
   a bridge rectifier including a first input terminal; and
   a current-limiting inductor electrically connected between the first output terminal of the lossless filament simulation circuit and the first input terminal of the bridge rectifier, and limiting a current flowing through the electronic ballast.

10. The LED tube according to Embodiment 9, further comprising a high-voltage prevention and isolation circuit, a human body-leakage current isolation and high-voltage startup simulation circuit and an LED module circuit, wherein the lossless filament simulation circuit further includes a second output terminal, the bridge rectifier further includes a second input terminal, the lossless filament simulation circuit further includes a first to a fourth capacitors and a first to a fourth resistors, the electronic ballast has a first to a fourth ballast terminals, the first capacitor and the first resistor are electrically connected in parallel between the first ballast terminal and the first output terminal, the second capacitor and the second resistor are electrically connected in parallel between the first output terminal and the second ballast terminal, the third capacitor and the third resistor are electrically connected in parallel between the third ballast terminal and the second output terminal, the fourth capacitor and the fourth resistor are electrically connected in parallel between the second output terminal and the fourth ballast terminal, the high-voltage prevention and isolation circuit includes a fifth capacitor and a fifth resistor, and the fifth capacitor and the fifth resistor are electrically connected in parallel between the second input terminal of the bridge rectifier and the second output terminal of the lossless filament simulation circuit.

According to the descriptions above, the present invention discloses an LED tube adapted for use with an electronic ballast, including a lossless filament simulation circuit, a current-limiting inductor, a high-voltage prevention and isolation circuit and a human body-leakage current isolation and high-voltage startup simulation circuit, wherein the lossless filament simulation circuit is free from generating a power loss when the LED tube operated normally, the high-voltage prevention and isolation circuit includes a capacitor and a resistor electrically connected in parallel and produces a high impedance at low frequency to prevent the LED tube from generating a break-down phenomenon and/or a flash-over phenomenon when a withstanding high voltage test of 1 k+2U is performed while the first ballast terminal and the second ballast terminal of the first lamp tube connector are short-circuited and the third ballast terminal and the fourth ballast terminal of the second lamp tube connector are short-circuited according to the IEC62776 specification, and the human body-leakage current isolation and high-voltage startup simulation circuit includes a thyristor element having a breakdown voltage to prevent the LED tube from becoming conductive before an input voltage reaches the breakdown voltage, protect the LED tube from burning out when mistakenly connected to one of an AC mains and an electronic ballast, and prevent a generation of a human body-leakage current when a 500 VAC AC mains frequency voltage test in the IEC62776 specification is performed, which is both non-obvious and novel in view of the prior art.

While the invention has been described in terms of what is presently considered to be the most practical and preferred embodiments, it is to be understood that the invention needs not be limited to the disclosed embodiments. Therefore, it is intended to cover various modifications and similar configuration included within the spirit and scope of the appended claims, which are to be accorded with the broadest interpretation so as to encompass all such modifications and similar structures.

What is claimed is:
1. An LED tube adapted for use with an electronic ballast, comprising:
   a lossless filament simulation circuit including:
   a first and a second output terminals;
   a first to a fourth capacitors; and
   a first to a fourth resistors, wherein the electronic ballast has a first to a fourth ballast terminals, the first capacitor and the first resistor are electrically connected in parallel between the first ballast terminal and the first output terminal, the second capacitor and the second resistor are electrically connected in parallel between the first output terminal and the second ballast terminal, the third capacitor and the third resistor are electrically connected in parallel between the third ballast terminal and the second output terminal, and the fourth capacitor and the fourth resistor are electrically connected in parallel between the second output terminal and the fourth ballast terminal;
   a bridge rectifier having a first and a second input terminals and a first and a second output terminals;
   a current-limiting inductor electrically connected between the first output terminal of the lossless filament simulation circuit and the first input terminal of the bridge rectifier for limiting a current flowing through the electronic ballast;
   a high-voltage prevention and isolation circuit having a fifth capacitor and a fifth resistor directly electrically connected in parallel between the second input terminal of the bridge rectifier and the second output terminal of the lossless filament simulation circuit, and producing a high impedance at low frequency to prevent the LED tube from a break-down phenomenon and/or a flash-over phenomenon when a withstanding high voltage test is performed;
   an LED module circuit having a first and a second input terminals, wherein the first input terminal of the LED module circuit is electrically connected to the first output terminal of the bridge rectifier; and
   a human body-leakage current isolation and high-voltage startup simulation circuit including a thyristor element and electrically connected between the second input terminal of the LED module circuit and the second output terminal of the bridge rectifier, wherein the thyristor element prevents an input voltage of the LED tube from becoming conductive before reaching a breakdown voltage of the thyristor element, protects the LED tube from burning out when mistakenly connected to one of an AC mains and the electronic ballast, and prevents a generation of a human body-leakage current when a 500 VAC AC mains frequency voltage test is performed.

2. The LED tube according to claim 1, wherein the electronic ballast further includes a first lamp tube connector having the first ballast terminal and the second ballast terminal and a second lamp tube connector having the third ballast terminal and the fourth ballast terminal, the bridge rectifier includes a first to a fourth diodes, each of which has an anode and a cathode, the anode of the first diode is electrically connected to the cathode of the second diode and the first input terminal of the bridge rectifier, the anode of the third diode is electrically connected to the cathode of the fourth diode and the second input terminal of the bridge rectifier, and an AC signal received by the first and the second input terminals of the bridge rectifier becomes a DC signal after being rectified to drive the LED module circuit.

3. The LED tube according to claim 2, wherein the first to the fourth diodes are one of four fast diodes and four Schottky diodes, the human body-leakage current isolation and high-voltage startup simulation circuit includes a thyristor element, and the bridge rectifier and the human body-leakage current isolation and high-voltage startup simulation circuit are configured on a chip.

4. The LED tube according to claim 3, wherein the thyristor element is one selected from a group consisting of a DIAC, an SUS, an SIDAC, an SBS, an ASBS, an SAS, an SCR, a TRIAC and a zener diode, is able to receive an external signal so as to perform a switching control, the high-voltage prevention and isolation circuit is used to cause a lamp tube current of the LED tube to be less than 100 mA when a withstanding high voltage test is performed while the first ballast terminal and the second ballast terminal of the first lamp tube connector are short-circuited and the third ballast terminal and the fourth ballast terminal of the second lamp tube connector are short-circuited.

5. The LED tube according to claim 4, wherein the current-limiting inductor is used for a self-oscillating ballast to change an impedance of a resonant tank of the electronic ballast so as to decrease the lamp tube current to adjust a lamp tube power.

6. The LED tube according to claim 1, wherein the electronic ballast is one selected from a group consisting of a rapid start electronic ballast, an instant start electronic ballast, a program start electronic ballast and a self-oscillating ballast, and the lossless filament simulation circuit simulates a filament impedance of a fluorescent lamp and is free from causing a loss in a circuit under a normal operation due to an extremely low high-frequency impedance of the first to the fourth capacitors.

7. An LED tube adapted for use with an electronic ballast, comprising:
a lossless filament simulation circuit including a first and a second output terminals electrically connected to the electronic ballast;
a bridge rectifier having a first and a second input terminals, and a first and a second output terminals, wherein the first input terminal is coupled to the first output terminal of the lossless filament simulation circuit;
a high-voltage prevention and isolation circuit having a capacitor and a resistor directly electrically connected in parallel between the second input terminal of the bridge rectifier and the second output terminal of the lossless filament simulation circuit, and producing a high impedance at low frequency to prevent the LED tube from a break-down phenomenon and/or a flash-over phenomenon when a withstanding high voltage test is performed;
an LED module circuit having a first and a second input terminals, wherein the first input terminal of the LED module circuit is electrically connected to the first output terminal of the bridge rectifier; and
a human body-leakage current isolation and high-voltage startup simulation circuit including a thyristor element and electrically connected between the second input terminal of the LED module circuit and the second output terminal of the bridge rectifier, wherein the thyristor element prevents an input voltage of the LED tube from becoming conductive before reaching a breakdown voltage of the thyristor element, protects the LED tube from burning out when mistakenly connected to one of an AC mains and the electronic ballast, and prevents a generation of a human body-leakage current when a 500 VAC AC mains frequency voltage test is performed.

8. The LED tube according to claim 7, further comprising a current-limiting inductor, wherein the electronic ballast includes a first to a fourth ballast terminals, a first lamp tube connector having the first ballast terminal and the second ballast terminal and a second lamp tube connector having the third ballast terminal and the fourth ballast terminal, the current-limiting inductor is electrically connected between the first output terminal of the lossless filament simulation circuit and the first input terminal of the bridge rectifier for limiting a current flowing through the electronic ballast, the capacitor is a fifth capacitor, the resistor is a fifth resistor, the high-voltage prevention and isolation circuit is used to cause a lamp tube current of the LED tube to be less than 100 mA when a withstanding high voltage test is performed while the first ballast terminal and the second ballast terminal of the first lamp tube connector are short-circuited and the third ballast terminal and the fourth ballast terminal of the second lamp tube connector are short-circuited, the lossless filament simulation circuit further includes a first to a fourth capacitors and a first to a fourth resistors, the first capacitor and the first resistor are electrically connected in parallel between the first ballast terminal and the first output terminal of the lossless filament simulation circuit, the second capacitor and the second resistor are electrically connected in parallel between the first output terminal of the lossless filament simulation circuit and the second ballast terminal, the third capacitor and the third resistor are electrically connected in parallel between the third ballast terminal and the second output terminal of the lossless filament simulation circuit, and the fourth capacitor and the fourth resistor are electrically connected in parallel between the second output terminal of the lossless filament simulation circuit and the fourth ballast terminal.

9. An LED tube adapted for use with a self-oscillating electronic ballast, comprising:
a lossless filament simulation circuit electrically connected to the electronic ballast and including a first and a second output terminals;
a bridge rectifier including a first and a second input terminals, and a first and a second output terminals; and
a current-limiting inductor electrically connected between the first output terminal of the lossless filament simulation circuit and the first input terminal of the bridge rectifier, and limiting a current flowing through the self-oscillating electronic ballast;

a high-voltage prevention and isolation circuit having a capacitor and a resistor directly electrically connected in parallel between the second input terminal of the bridge rectifier and the second output terminal of the lossless filament simulation circuit, and producing a high impedance at low frequency to prevent the LED tube from a break-down phenomenon and/or a flashover phenomenon when a withstanding high voltage test is performed;

an LED module circuit having a first and a second input terminals, wherein the first input terminal of the LED module circuit is electrically connected to the first output terminal of the bridge rectifier; and a human body-leakage current isolation and high-voltage startup simulation circuit including a thyristor element and electrically connected between the second input terminal of the LED module circuit and the second output terminal of the bridge rectifier, wherein the thyristor element prevents an input voltage of the LED tube from becoming conductive before reaching a breakdown voltage of the thyristor element, protects the LED tube from burning out when mistakenly connected to one of an AC mains and the electronic ballast, and prevents a generation of a human body-leakage current when a 500 VAC AC mains frequency voltage test is performed.

10. The LED tube according to claim 9, wherein the capacitor is a fifth capacitor, the resistor is a fifth resistor, the lossless filament simulation circuit further includes a first to a fourth capacitors and a first to a fourth resistors, the electronic ballast has a first to a fourth ballast terminals, the first capacitor and the first resistor are electrically connected in parallel between the first ballast terminal and the first output terminal of the lossless filament simulation circuit, the second capacitor and the second resistor are electrically connected in parallel between the first output terminal of the lossless filament simulation circuit and the second ballast terminal, the third capacitor and the third resistor are electrically connected in parallel between the third ballast terminal and the second output terminal of the lossless filament simulation circuit, the fourth capacitor and the fourth resistor are electrically connected in parallel between the second output terminal of the lossless filament simulation circuit and the fourth ballast terminal, and the fifth capacitor and the fifth resistor are electrically connected in parallel between the second input terminal of the bridge rectifier and the second output terminal of the lossless filament simulation circuit.

* * * * *